J. OLANDER.
MANURE SPREADER ATTACHMENT.
APPLICATION FILED MAR. 4, 1910.
968,788.
Patented Aug. 30, 1910.
2 SHEETS—SHEET 1.
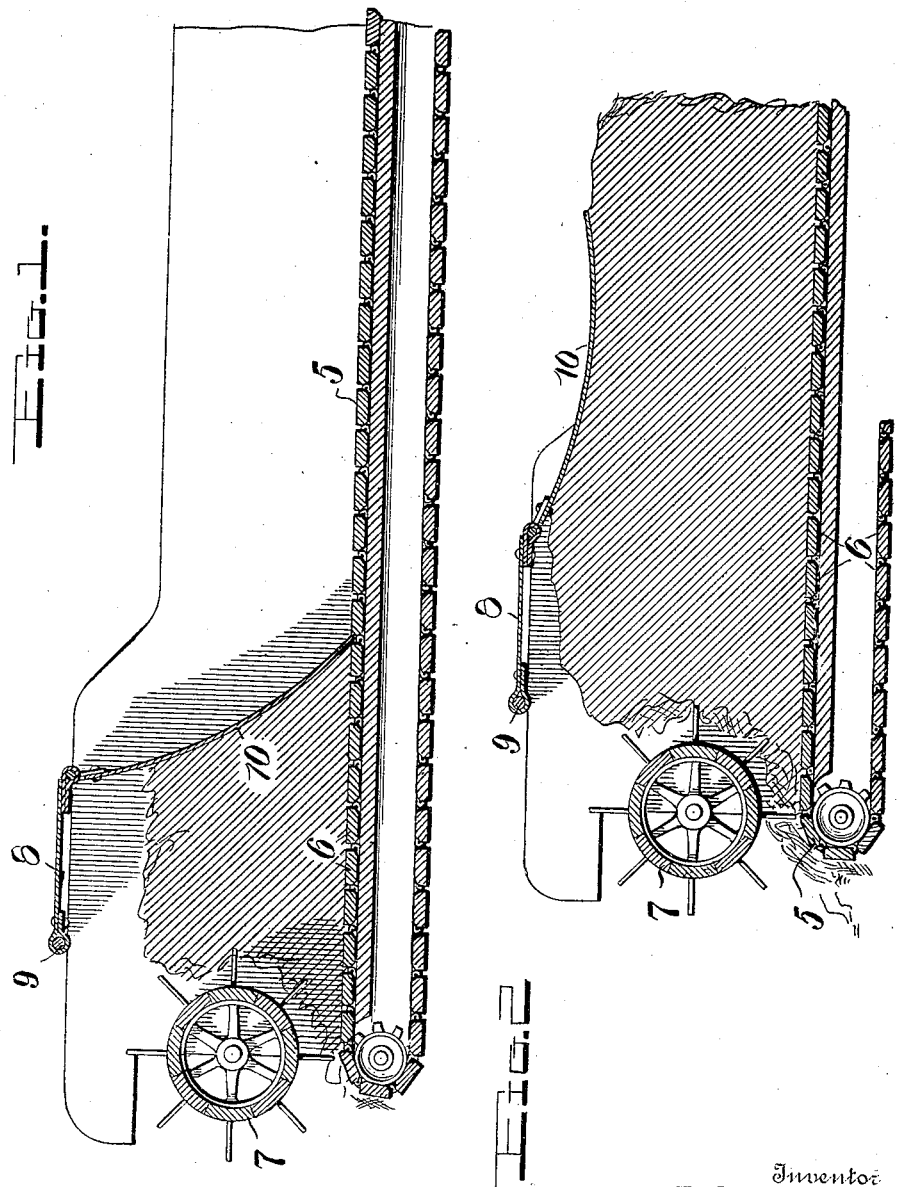
Witnesses
Chas. L. Gricebauer.
E. M. Ricketts.
Inventor
J. Olander,
By Watson E. Coleman.
Attorney

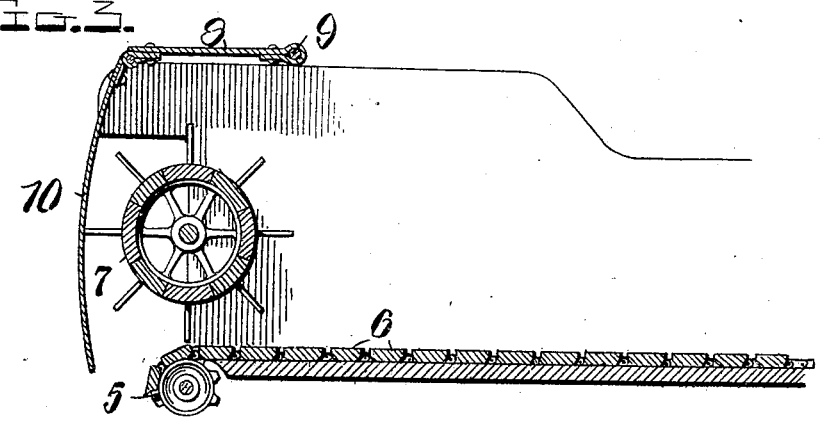
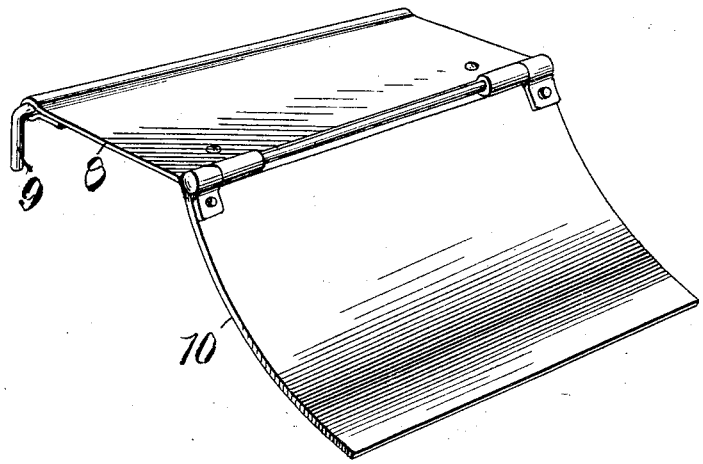

UNITED STATES PATENT OFFICE.

JONAS OLANDER, OF NEKOMA, ILLINOIS.

MANURE-SPREADER ATTACHMENT.

968,788.      Specification of Letters Patent.    Patented Aug. 30, 1910.

Application filed March 4, 1910. Serial No. 547,260.

*To all whom it may concern:*

Be it known that I, JONAS OLANDER, a citizen of the United States, residing at Nekoma, in the county of Henry and State of Illinois, have invented certain new and useful Improvements in Manure-Spreader Attachments, of which the following is a specification, reference being had to the accompanying drawings.

This invention relates to certain new and useful improvements in feeding devices for manure spreaders and has for its object to provide a device of this character which is automatically actuated by the movement of an endless apron which conveys the material to the spreader arranged in one end of the wagon body whereby the material will be forced against the rotating spreading cylinder to insure the entire contents of the wagon body being distributed.

A further object is to provide a very simple force feed for manure and other fertilizer spreading machines which is adapted to be arranged upon all machines employing an endless apron for conveying the material to the spreading cylinder.

With these and other objects in view, the invention consists of the novel features of construction and the combination and arrangement of parts hereinafter fully described and claimed, and illustrated in the accompanying drawings, in which—

Figure 1 is a longitudinal section through the body of a manure spreader illustrating my improved feeding device in operative position; Fig. 2 is a fragmentary view similar to Fig. 1 showing the feeding plate at the start of the distribution of the material; Fig. 3 is a view similar to Fig. 2 showing the arrangement of the device when the machine is being loaded; and Fig. 4 is a detail perspective view of the feeding device detached.

Referring more particularly to the drawings 5 indicates an endless apron which is formed of a plurality of slats. These slats may be hingedly connected together in any preferred manner and the apron moved by means of suitable mechanism to carry the manure or other fertilizer to the rear end of the body of the machine for engagement by the radially extending fingers of a rotatable cylinder 7. This cylinder is adapted to throw the manure outwardly and distribute the same over the land.

My improved feeding device is adapted to be arranged upon the rear end of the body of the vehicle and comprises a plate 8 extending transversely thereacross and pivotally mounted upon a transverse rod 9. This rod has its ends secured in the sides of the wagon box, the intermediate portion thereof being spaced above the same. When in operative position the plate 8 extends forwardly as shown in Fig. 1. This plate has hinged upon its forward edge the curved feed plate 10. The outer edge of this plate is adapted to engage between the slats 6 of the apron 5 and is positioned with its convex surface next to the material.

When the machine is to be loaded with the manure, the plates 8 and 10 are swung upon the transverse pivot rod 9 and positioned rearwardly of the body of the vehicle as shown in Fig. 3. After the machine has been loaded, the feeding device is swung over and upon the top of the material. As the amount of the material in the machine decreases and is spread, the plates 8 and 10 will gravitate downwardly between the sides of the wagon box until the free edge of the feed plate 10 engages between the slats of the apron. It will then move rearwardly with the apron, and force the remainder of the fertilizer upon the fingers of the distributing cylinder thus insuring the distribution of the entire contents of the machine. The plate 8 maintains a substantially horizontal position above the wagon box during the feeding movement of the plate 10. After the contents of the machine have been exhausted, the plates 8 and 10 may be readily lifted and swung back upon the rear end of the wagon box and the machine again loaded with the material.

From the foregoing it is believed that the construction, operation and many advantages to be obtained by means of my improved force feed device will be readily understood without requiring a more extended description.

The device is extremely simple and may be readily arranged upon machines of this character as at present constructed, no change whatever being required in the construction of the operating mechanism, nor is it necessary to provide additional operating means for the feeding device the same being actuated by the movement of the endless driving belt or apron.

While I have above set forth in detail the preferred construction of my improved feeding device it will be obvious that the same is susceptible of many minor changes without departing from the essential features or sacrificing any of the advantages thereof.

Having thus described the invention what is claimed is:—

1. In a machine of the character described, the combination with an endless apron formed of a plurality of hingedly connected slats and a distributing cylinder rotatably mounted above one end of the apron, of a feeding device comprising a plate pivotally mounted for swinging movement above the cylinder, and a feeding plate hingedly connected to said first named plate and adapted to engage between the slats of said apron and to force the material conveyed thereby upon the distributing cylinder.

2. A device of the character described comprising a plate pivotally mounted and transversely positioned above an endless conveyer, and a curved plate hingedly connected to the first named plate having its free edge engaged with said conveyer and adapted to force the material conveyed thereby upon a distributing cylinder substantially as and for the purpose set forth.

3. A device of the character described comprising a plate transversely positioned above an endless apron formed with a plurality of hingedly connected slats, said plate being pivotally supported at one of its longitudinal edges, and a feeding plate hingedly connected to the other longitudinal edge of the first named plate, said feed plate having its free edge engaged between the slats of the apron and adapted to force the material conveyed thereby upon a distributing cylinder arranged upon one end of the apron.

4. A device of the character described comprising a plate transversely arranged above an endless apron movably arranged in the body of a fertilizer distributer, said plate having one of its longitudinal edges hingedly engaged upon a transverse rod secured in the opposite sides of the vehicle body, and a transversely extending concavo-convex feed plate hingedly connected with the free edge of said first named plate for relative movement thereto adapted to engage with the apron and to be moved thereby to force the fertilizer upon a distributing cylinder mounted in the vehicle body above one end of the apron, said first named plate being arranged in a substantially horizontal position above the vehicle body whereby the discharge of the material over the sides thereof is prevented.

In testimony whereof I hereunto affix my signature in the presence of two witnesses.

JONAS OLANDER.

Witnesses:
J. I. HUNT,
SAM HENDERSON.